United States Patent
Amalric (10) Patent No.: US 9,878,807 B2
(45) Date of Patent: Jan. 30, 2018

(54) THRUST NOZZLE SYSTEM AND METHOD FOR THE ORBIT AND ATTITUDE CONTROL OF A GEOSTATIONARY SATELLITE

(71) Applicant: THALES, Neuilly-sur-Seine (FR)

(72) Inventor: Joel Amalric, Cannes-la-Bocca (FR)

(73) Assignee: Thales, Courbevoie (FR)

(*) Notice: Subject to any disclaimer, the term of this patent is extended or adjusted under 35 U.S.C. 154(b) by 190 days.

(21) Appl. No.: 14/553,801

(22) Filed: Nov. 25, 2014

(65) Prior Publication Data

US 2015/0307214 A1    Oct. 29, 2015

(30) Foreign Application Priority Data

Nov. 29, 2013  (FR) .................................. 13 02782

(51) Int. Cl.
  *B64G 1/40*  (2006.01)
  *B64G 1/26*  (2006.01)
  *B64G 1/10*  (2006.01)

(52) U.S. Cl.
  CPC .............. *B64G 1/40* (2013.01); *B64G 1/10* (2013.01); *B64G 1/26* (2013.01); *B64G 1/405* (2013.01)

(58) Field of Classification Search
  CPC ... B64G 1/40; B64G 1/10; B64G 1/26; B64G 1/405
  See application file for complete search history.

(56) References Cited

U.S. PATENT DOCUMENTS

| | | | | |
|---|---|---|---|---|
| 5,020,746 A * | 6/1991 | Anzel | ...................... | B64G 1/26 244/164 |
| 5,312,073 A * | 5/1994 | Flament | ................... | B64G 1/24 136/292 |
| 5,383,631 A * | 1/1995 | Mazzini | ................... | B64G 1/26 244/164 |
| 5,595,360 A * | 1/1997 | Spitzer | .................... | B64G 1/007 244/158.5 |
| 5,810,295 A * | 9/1998 | Anzel | .................... | B64G 1/242 244/158.6 |
| 5,850,992 A | 12/1998 | Flament et al. | | |
| 6,053,455 A * | 4/2000 | Price | ........................ | B64G 1/26 244/169 |
| 2003/0010871 A1* | 1/2003 | Wang | ....................... | B64G 1/24 244/172.7 |

(Continued)

FOREIGN PATENT DOCUMENTS

RU    2124461 C1   1/1999
WO    9209479 A2   6/1992

*Primary Examiner* — Justin M Benedik
(74) *Attorney, Agent, or Firm* — Baker Hostetler LLP (57) ABSTRACT

A thrust nozzle system is provided for a satellite designed to be stabilized in autorotation over a geostationary orbit, the satellite comprising three reference axes X, Y and Z, the Y axis representing the North/South axis and the Z axis corresponding to an Earth pointing direction. The thrust nozzle system comprises a first set of thrust nozzles configured for maintaining the satellite in station, the first set comprising an even number of thrust nozzles using electrical propulsion, with a pre-adjusted orientation, the even number being equal to at least 4, the thrust nozzles being oriented along three spatial components, and having, taken in pairs, different signs of X and Y components.

22 Claims, 4 Drawing Sheets

(56) References Cited

U.S. PATENT DOCUMENTS

2009/0078829 A1* 3/2009 Ho .................... B64G 1/242
  244/169
2014/0361124 A1* 12/2014 Celerier ............. B64G 1/242
  244/158.6

* cited by examiner

THRUST NOZZLE SYSTEM AND METHOD FOR THE ORBIT AND ATTITUDE CONTROL OF A GEOSTATIONARY SATELLITE

CROSS-REFERENCE TO RELATED APPLICATION

This application claims priority to foreign French patent application No. FR 1302782, filed on Nov. 29, 2013, the disclosure of which is incorporated by reference in its entirety.

FIELD OF THE INVENTION

The present invention generally relates to propulsion systems for geostationary satellites and, in particular, to a thrust nozzle system and a method for the orbit and attitude control of a geostationary satellite.

BACKGROUND

For the control of their orbit and of their attitude, satellites use an assembly of actuators and, in particular, a set of thrust nozzles.

The thrust nozzle system may comprise thrusters using electrical propulsion or thrusters using chemical propulsion.

In known embodiments, the satellite comprises a hybrid thrust nozzle system, including both thrusters using electrical propulsion and thrusters using chemical propulsion. These thrust nozzles are used separately for maintaining in station of a satellite. In particular, the thrust nozzles using electrical propulsion are used for the control out of the plane of the orbit (generally referred to as "North-South control"), whereas the thrust nozzles using chemical propulsion are used for the control in the plane of the orbit (referred to as "East-West control"), and for the manoeuvres for control of the angular momentum vector (unsaturation or unloading of the flywheels). Such a hybrid system has however a ratio launch-loaded satellite mass over useful mass for the payload and/or the operational lifetime of the satellite which is unfavourable.

In the new generation satellites, "all electric" solutions for all of the elements of the satellite are increasingly being adopted. This "all electric" approach may enable sufficient mass to be gained such that the same launch vehicle can carry two satellites, which results in lower costs for the launch of satellites. Systems of thrust nozzles only comprising thrusters using electrical propulsion have thus been provided. Electrical thrusters offer a better specific impulse than the thrusters using chemical propulsion. However, these "all electric" thrust nozzle systems require additional mechanisms to be provided in the satellite for orientation of the thrust with a narrow angular travel (for example, of the 2-axis thruster orientation mechanism type) or else thrust orientation mechanisms with a wide angular travel (for example, of the 2-axis, 3-axis or more articulated arm type). However, these mechanisms with a wide travel may exhibit an increased adjustment complexity leading to defects in parallelism and/or in orthogonality and pose problems of reliability. This results in a very degraded operation in the case of a functional loss of an orientation mechanism. Furthermore, they increase the total mass of the satellite, the complexity of the flight software, and also the cost of the onboard equipment.

SUMMARY OF THE INVENTION

The invention improves the situation by providing a thrust nozzle system for a satellite designed to be stabilized in autorotation over a geostationary orbit, the satellite comprising three reference axes X, Y and Z, the Y axis representing the North/South axis and the Z axis corresponding to an Earth-pointing direction. Advantageously, the system comprises a first set of thrust nozzles configured for maintaining the satellite in station, the first set comprising an even number of thrust nozzles using electrical propulsion, with a pre-adjusted orientation, the said even number being equal to at least 4, the thrust nozzles being oriented along three spatial components, and having, taken in pairs, different signs of X and Y components.

According to one feature of the invention, the position of the fixed thrust nozzles may be chosen such that the thrusters are aligned to the neighbourhood of the centre of gravity of the satellite while conserving a limited torque with respect to the capacity of the flywheels of the satellite.

The position of the thrust nozzles may furthermore be chosen in such a manner as to take into account the displacement of the centre of gravity of the satellite over the lifetime of the satellite.

According to another feature of the invention, the thrust nozzle system may comprise a second set of thrust nozzles comprising at least two thrusters using electrical propulsion, the second set of thrust nozzles being configured for at least setting the satellite in station, and the thrust nozzles of the second set being oriented substantially along the same satellite axis.

In one embodiment of the invention, each thrust nozzle of the first set can form a chosen angle of inclination $\theta$ with respect to the Y axis.

In another embodiment of the invention, the thrust nozzles of the first set have angles of inclination $\theta$ substantially identical with respect to the Y axis.

As a variant, the thrust nozzles of the first set can have different angles of inclination $\theta$ with respect to the Y axis.

The first set of thrust nozzles can comprise:
- a thrust nozzle arranged on the edge bounded by the North face and East face of the body of the satellite; and/or
- a thrust nozzle arranged on the edge bounded by the South face and East face of the body of the satellite; and/or
- a thrust nozzle arranged on the North face in the neighbourhood of the edge bounded by the North face and West face; and/or
- a thrust nozzle arranged on the South face in the neighbourhood of the edge bounded by the South face and East face of the body of the satellite; and/or
- a thrust nozzle arranged on the East face of the body of the satellite, in the neighbourhood of the edge bounded by the South face and East face of the body of the satellite; and/or
- a thrust nozzle arranged on the West face of the body of the satellite, in the neighbourhood of the edge bounded by the South face and West face of the body of the satellite.

According to another feature of the invention, the thrust nozzles of the first set are non-coplanar.

In one embodiment of the invention, at least one of the thrust nozzles from the first set forms a pivot angle $\sigma$ with respect to the YZ plane.

In particular, the thrust nozzles of the first set can have different respective pivot angles $\sigma$ with respect to the YZ plane.

According to one feature of the invention, the first set of thrust nozzles can comprise at least one thrust nozzle arranged in the neighbourhood of an external corner of the body of the satellite.

According to another aspect of the invention, the satellite can comprise flywheels while the first set of thrust nozzles is used for implementing the control of the vector of the angular momentum in the case of unloading of the flywheels.

The invention furthermore provides a method for the orbit and attitude control of a geostationary satellite, comprising a thrust nozzle system according to one of the features hereinabove, the method comprising the ignition of the thrust nozzles of the first set independently from one another while the satellite is maintained in station.

Maintaining the satellite in station may be carried out over a given number of control days and, for each control day, the method can comprise the placing of one thrust nozzle from the first set of thrust nozzles at a given orbital position, by applying a chosen duration of thrust in such a manner that the net correction of the orbital elements at the end of the day is equal to a target correction vector.

The method can also comprise the activation of the thrust nozzles of the second set of thrust nozzles in at least one of the following phases from amongst the phases of life of the satellite: repositioning of the satellite and the setting into stable orbit at the end of life of the satellite.

According to one feature of the invention, the method can comprise the simultaneous ignition of the thrust nozzles of the second set of thrust nozzles.

The thrust nozzle system according the embodiments of the invention thus allows the drawbacks of the hybrid thrust nozzle systems to be overcome. In particular, it does not require any sub-system using chemical propulsion nor any chemical propellants in the satellite, and the North/South and East/West combined control is more efficient and less costly in propellants.

Furthermore, in contrast to the conventional "all electric" thrust nozzle systems, the thrust nozzle system according to the embodiments of the invention obviates the need for the thrust orientation mechanisms conventionally provided in the satellite. Furthermore, in the case of loss of a thruster using electrical propulsion, the functions for setting and maintenance in station are still feasible.

BRIEF DESCRIPTION OF THE DRAWINGS

Other features and advantages of the invention will become apparent with the aid of the description that follows and from the figures of the appended drawings in which.

DETAILED DESCRIPTION

Appendix A contains a set of formulae used in the description of certain embodiments of the invention.

The drawings and the appendices to the description comprise, for the most part, elements of a well-defined nature. They will therefore be able to be used not only to provide a better understanding of the description, but also to contribute to the definition of the invention, where appropriate.

Figure 1:
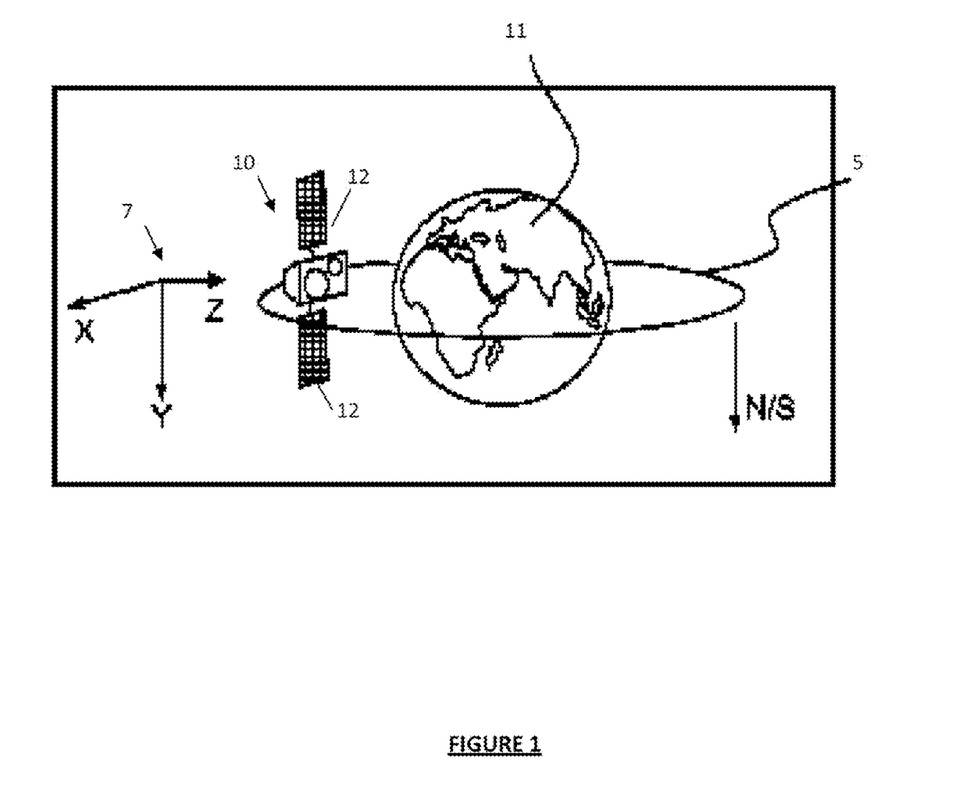
FIG. 1 is a diagram representing a satellite in orbit.

FIG. 1 shows one example of a geostationary satellite 10, comprising a platform equipped with solar panels 12 and with a payload comprising transmitting and receiving antennas. For any satellite 10 in orbit 5 around the Earth 11, a reference frame 7 linked to the satellite is defined. This reference frame is formed by the true orthonormal trihedron consisting of the axes X, Y and Z. In FIG. 1, the X axis corresponds to a direction of flight on an orbit around the Earth, the Y axis is oriented North/South, and the yaw axis Z is orthogonal to the plane formed by the X and Y axes and corresponds to an Earth pointing direction. The satellite can also comprise hardware and software equipment dedicated to its operation, such as flywheels integrated into the body of the satellite (actuators for the control of attitude), and an attitude and orbit control system.

When the satellite is stabilized on 3-axes, the Z axis, called yaw axis, is directed towards the Earth, the Y axis, referred to as pitch axis, is perpendicular to the plane of the orbit, and the X axis, referred to as pitch axis, is perpendicular to the Z and Y axes and in the same direction as the instantaneous linear speed of the satellite around its orbit, the direction of the Y axis being such that the reference frame (X, Y, Z) is true.

Figure 2:
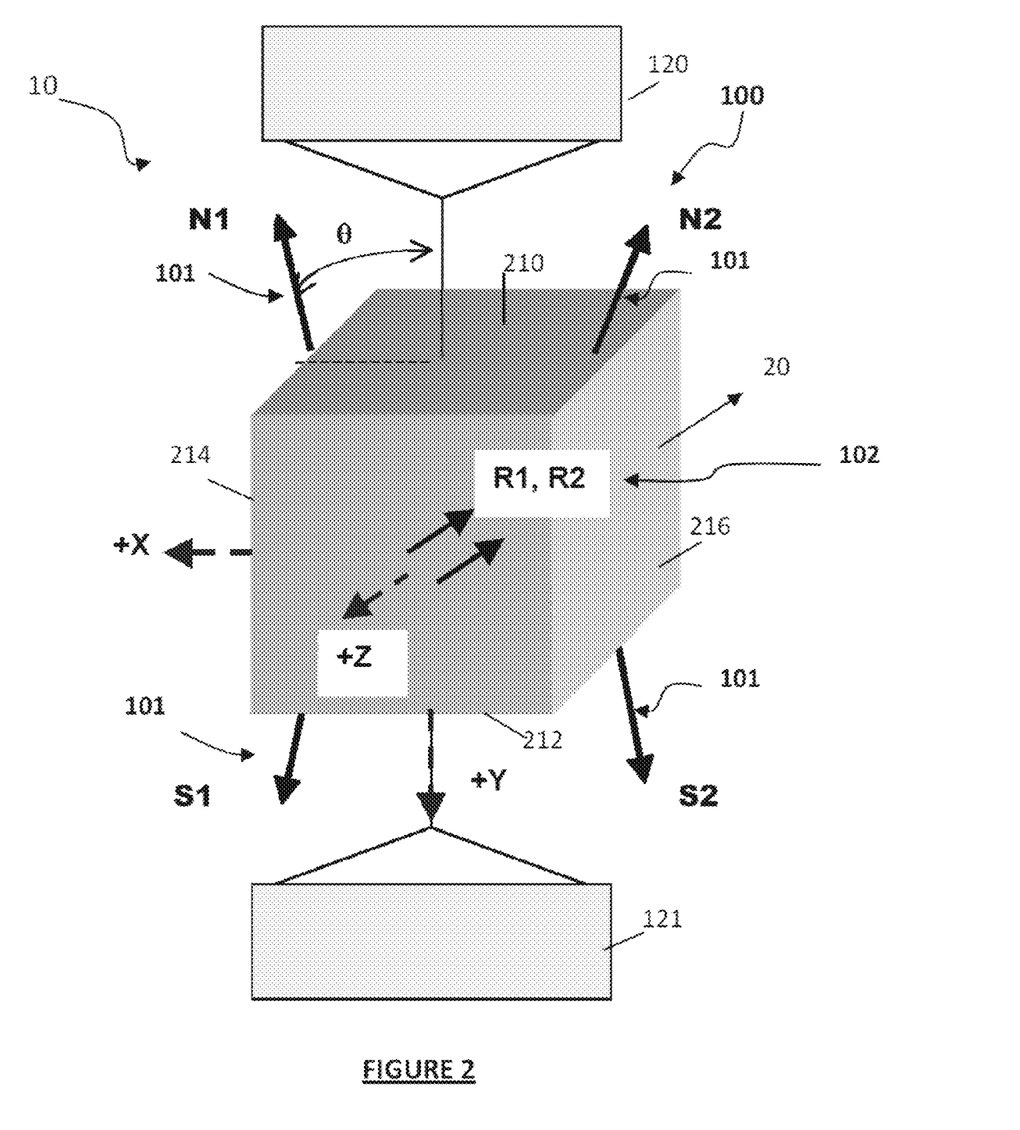
FIG. 2 is a diagram representing the thrust nozzle system according to a first embodiment of the invention.

FIG. 2 is a schematic representation of a thrust nozzle system 100 according to one embodiment of the invention. FIG. 2 shows schematically the body of the satellite 20 in the form of a rectangular parallelepiped. The attachment points of the solar panels on their axis of rotation are shown in the form of a rectangle, for the North solar panels 120 and the South solar panels 121.

According to one aspect of the invention, the thrust nozzle system 100 according to the invention comprises an even number of thrust nozzles using electrical propulsion which have an orientation pre-adjusted prior to the launch of the satellite. In FIG. 2, the satellite is shown as seen by an observer on the Earth's equator near to the sub-satellite point (point of intersection between the Earth's surface and the line which passes through the centre of the Earth and the satellite).

In particular, the thrust nozzle system 100 according to the invention can comprise a first set of thrust nozzles 101, comprising an even number of thrust nozzles equal to at least 4 (for example 4, 6 or 8). The thrust nozzles of the first set 101 have a pre-adjusted orientation and are generally oriented into a position close to the centre of mass of the satellite. In one preferred embodiment of the invention, the thrust nozzles of the set 101 are non-coplanar. The following part of the description will be presented with reference to a first set of thrust nozzles comprising 4 thrust nozzles by way of non-limiting example. The 4 thrust nozzles of the first set are denoted hereinafter N1, N2, S1 and S2. The thrust nozzles of the first set 101 comprise two pairs of thrusters on either side of the XZ plane: the first pair of thrust nozzles (N1, N2) is generally directed towards the North (−Y axis) and the second pair of thrust nozzles (S1, S2) is generally directed towards the South (+Y axis). Furthermore, the thrust nozzles of the same pair (for example N1 and N2) have components along the Y axis of the same sign and components along the X axis of opposite signs. Each thrust nozzle forms, in particular, a chosen angle of inclination θ with respect to the Y axis. Thus, the thrust nozzles of the first set of thrust nozzles have, taken in pairs, components along the X axis with opposite signs, which allows all of the orbital elements to be corrected, and also a cantilever or torque capacity on the various axes of the satellite to be obtained. The 4 thrust nozzles of the first set of thrust nozzles 101 according to the invention are, in particular, used for maintaining in station, or alternatively in a combined manner for maintaining in station and the control of the angular momentum vector. Each thrust nozzle of the first set of thrust nozzles can be ignited independently of the others.

According to one aspect of the invention, the position of the thrusters 101 can be chosen such that the thrusters are aligned to the neighbourhood of the centre of gravity of the satellite while conserving a limited torque with respect to the capacity of the flywheels of the satellite. The position of the thrust nozzles may furthermore be chosen in such a manner as to take into account the displacement of the centre of gravity of the satellite over the lifetime of the satellite.

Thus, the need for a displacement mechanism for the control of the angular momentum vector is replaced by a process of pre-adjustment on the ground, thus obviating the need to carry a displacement mechanism for the thrusters onboard the satellite. More precisely, the pre-adjustment on the ground is carried out in such a manner that there is no longer any onboard displacement during the operations for maintaining the satellite in station and for the control of the angular momentum vector.

The thrust nozzles of the first set of thrust nozzles 101 are advantageously pre-adjusted prior to the launch of the satellite, and have a fixed orientation with respect to the body of the satellite 20.

In the case of a failure of one of the thrust nozzles of the first set of thrust nozzles 101, it is possible according to the invention to use all the thrusters from the first set of thrust nozzles (3 in the embodiment illustrated), or only some of them, for maintaining in station in the case of a failure of a thruster, on the basis of another strategy for maintaining in station and of an evaluation of the loss of efficiency.

The thrust nozzle system 100 may furthermore comprise a second set of thrust nozzles 102 comprising at least two fixed thrusters for the other phases of the lifecycle of the satellite (for example 2, 3 or 4 fixed thrusters), notably setting into orbit, the insertion into final orbit, the repositioning in longitude and the setting into a 'cemetery' orbit at the end of the operational life. The thrust nozzles of the second set of thrust nozzles 102 are oriented substantially along the same satellite axis, for example the yaw axis Z. The following part of the description will be presented with reference to a second set of thrust nozzles 102 comprising two thrust nozzles, denoted R1 and R2, by way of non-limiting example. According to another feature of the invention, all the thrust nozzles of the second set of thrust nozzles can be ignited simultaneously.

The thrust nozzle system 100 according to the invention is adapted to all the phases of the life of the satellite, and notably:
 the phase for setting in station, which corresponds to the period from the injection by the launch vehicle until arriving at the definitive position of the satellite;
 the phase for maintaining in station, which corresponds to the phase for nominal operation of the satellite;
 the rescue phase, where needed, which corresponds to a failure and during which the altitude of the satellite may be modified; and
 the de-activation or disorbitation phase, during which the satellite is sent into an orbit referred to as 'cemetery orbit'.

In order to get into orbit, the resultant thrust vector associated with the thrust nozzles of the second set 102 (the thrust nozzles of the second set of thrust nozzles are advantageously ignited simultaneously) is aligned with the desired direction for the thrust vector, as calculated by a device for low-thrust trajectory optimization installed on the ground or on board. A system for attitude guidance on three axes and for rotational control of the solar panels is then used in this case.

For the insertion into final orbit, the repositioning in longitude, the setting into cemetery orbit, the resultant thrust vector associated with the thrust nozzles of the second ensemble 102 is aligned along the trajectory, in other words substantially parallel with respect to the velocity vector of the satellite in the desired tangential direction (+/−S). A rotational pivoting manoeuvre (or 'yaw slew') of +/−90 degrees may be necessary in order to achieve an attitude with respect to the pointing direction in normal mode, and a rotational manoeuvre in the opposite direction, of −/+90 degrees in order to return to the pointing direction in normal mode.

In the case of a failure of one of the electro-propelled thrusters from the second set of thrust nozzles 102, the remaining thrusters are ignited. The impact to a first order on the thrust duration is a factor of two, whereas the impact on the fuel consumption (or in an equivalent manner on the speed increment Delta-V) is then negligible.

The angles of inclination $\theta$ and of pivoting $\alpha$ of the coplanar thrust nozzles of the first set of thrust nozzles 101, and also the overall number of thrust nozzles 101 and 102 can be adjusted before the launch of the satellite, for example by means of a simulator, in a such a manner that:
 the first set of thrust nozzles 101 is used for maintaining in station, including the orbit control and the control of the angular momentum vector;
 the second set of thrust nozzles 102 is used for the setting in station and the other phases of life of the satellite.

After the launch of the satellite, the thrusters can subsequently conserve the orientation initially fixed. Thus, with the thrust nozzle system 100 according to the invention, it is not necessary to provide any additional adjustment mechanism for re-adjusting the orientation of the thrusters during flight. This results in a significant mass gain in the satellite and a reduction in the overall cost of the satellite.

For an efficient operation, the thrusters using electrical propulsion must be substantially aligned with the centre of mass of the satellite at given moments in time during the operational lifetime (for example, quarter of life alignment, mid-life alignment, third of life alignment). Also, the thrust nozzles of the system 10 according to the invention may be adjusted in such a manner as to be substantially aligned with the centre of mass of the satellite prior to the launch of the satellite. Such an arrangement of the thrust nozzles of the first set 101 and their use in the phase for maintaining in station thus allows the torques to be minimized over the operational lifetime of the satellite.

Advantageously, the same thruster technology using electrical propulsion can be used for the two sets of thrust nozzles 101 and 102, but at different points of use.

In particular, the thrust nozzles of the second set 102 (R1 and R2) may be chosen at different points of operation of the electrical power supplied to the cathode of the electro-propelled thrusters, and in a manner compatible with the power balance of the satellite. This results in a higher thrust with a lower specific impulse for the first set of thrust nozzles 101 than for the second set of thrust nozzles 102.

As a variant, the thrust nozzles of the first set 101 (N1, N2, S1, S2) may be chosen so as to have a lower thrust with a higher specific impulse than the thrust nozzles of the second set 102.

It is however possible, without straying from the scope of the present invention, to use thrusters for the first set 101 with a technology different from those of the second set of thrust nozzles 102, for example a technology based on the use of a motor using ejectable powder.

The choice of these relative proportions of the parameters thrust/specific impulse for each set of thrust nozzles 101 and 102 can have an effect that is different according to the phase of life of the satellite. In particular:

For achieving orbit, the number of thrust nozzles installed together with the electrical power supplied can allow a reasonable transfer time to be obtained, typically from 2 to 6 months (depending on the client and on the chosen launch vehicle), at the expense of additional fuel;

For the insertion into final orbit, the repositioning in longitude, the positioning at the end of life, the chosen proportions allow an acceleration under a sufficient thrust to be obtained in order to safely keep to the region used around the ring GEO without entering into the neighbouring Est/West window (considering a radial separation of +/−40 km, and a longitudinal and latitudinal window of +/−70 km or +/−0.05 degrees); and For maintaining in station, the chosen proportion can allow a sufficient specific pulse to be obtained and the fuel consumption to be limited for a given cost in Delta-V.

As is known per se, the specific impulse (generally denoted $I_{sp}$) is representative of the efficiency of a propulsion system. It is defined as a quotient of two quantities, one representing the thrust of a rocket engine, and the other representing the product of the mass flow rate of propellant and the normal value of the acceleration due to gravity (or weight-flow rate of the propellant ejected). The specific impulse indicates the period of time during which a kilogram of propellant produces a thrust enabling a mass of one kilogram to be moved (being a force of around 9.81 N) in the Earth's gravitational field.

As regards the parameter Delta-V, this denotes the measurement of change (Delta or Δ) of speed of the satellite. It is expressed in distance travelled per unit of time (metres per second) and is calculated by subtracting the speed before the change from the speed after the change, or by integrating the modulus of the acceleration due to the thrust over the duration of the manoeuvre. The Delta-V can be used for estimating the quantity of propellant needed to accomplish a manoeuvre, a change of trajectory, in order to reach a distant destination.

The thrust nozzle system 100 offers the advantage of not requiring any additional chemical propulsion subsystem. Although such a subsystem is not required, the invention is compatible with the use of such a subsystem: for example the propellant xenon could be used as a cold gas (with a very low specific impulse) for very rare events during the lifetime of the satellite, such as an FDIR (acronym for "Failure Detection Isolation and Recovery") event, which requires a low Delta-V (of an order of magnitude of a few m/sec).

The thrust nozzles N1, N2, S1 and S2 from the first set of thrust nozzles 101 according to the first embodiment of the invention may be disposed on the North (210), South (212), East (214) and West (216) faces of the satellite in several ways, in particular:

On the edge bounded by the North face 210 and East face 214 (thrust nozzle N1) and/or on the edge bounded by the South face 212 and East face 214 (thrust nozzle S2), On the North face 210 in the neighbourhood of the edge bounded by the North face 210 and West face 216 (thrust nozzle N2), and/or on the South face 212 in the neighbourhood of the edge bounded by the South face 212 and East face 214 (thrust nozzle S1).

They may also be disposed on the East face 214 in the neighbourhood of the edge bounded by the South face 212 and East face 216 (for the thrust nozzle S1), and/or on the West face 216 in the neighbourhood of the edge bounded by the South face 212 and West face 216 (thrust nozzle S2).

Figure 3:
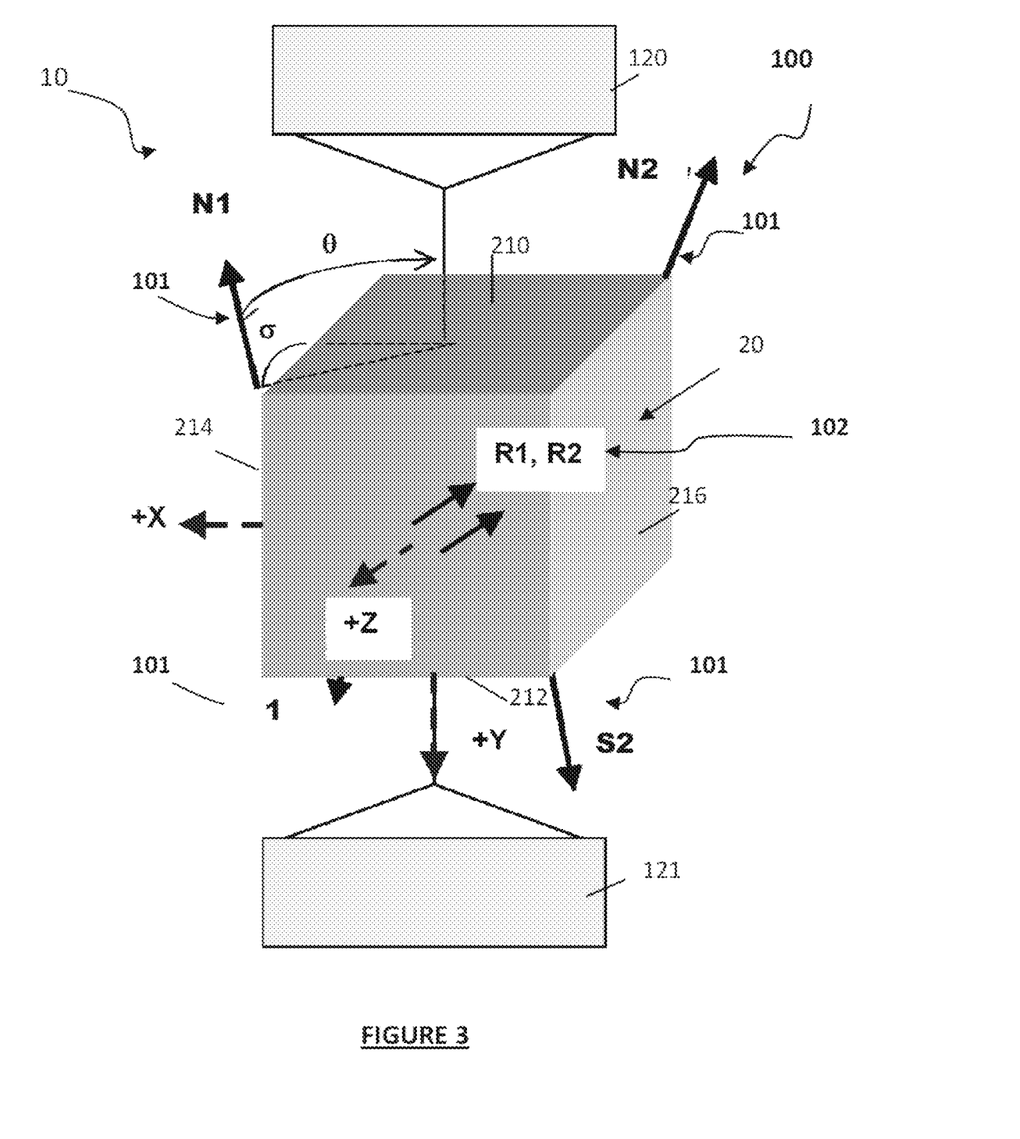
FIG. 3 is a diagram representing the thrust nozzle system according to a second embodiment of the invention.

Such a configuration is situated substantially in the fixed YZ plane of the body of the satellite. Complementarily, components +/−X may be added to each thruster using electrical propulsion in order to provide a capacity for control of attitude along three axes. In the case of additional components +/−X, the 4 thrusters using electrical propulsion from the set 101, which are used for maintaining the satellite in its station, may be arranged near to the corners of body of the satellite 20, in a "transverse" configuration according to a second embodiment of the invention as shown in FIG. 3.

The system of coordinates conventionally used in orbital mechanics for the equations of motion is the RSW system where:

R denotes the radial direction from the centre of the Earth to the satellite,

S=W×R is the tangential direction close to the direction of the velocity of the satellite, and W denotes the direction of the orbital momentum vector (out-of-plane).

The stabilization of a satellite 10 along three axes (the satellite is then referred to as "3-axis stabilized") consists in maintaining the reference frame (X, Y, Z) linked to the satellite in the closest neighbourhood to the reference frame (R, W, S), by choosing X=+S, Y=−W, and Z=−R.

In operational orbit (GEO), the satellite is in a mode said to be 'normal' (3-axis stabilized) such that the direction of the thrust of the electro-propelled thrusters with a fixed body is fixed in the local orbital system of coordinates.

The axial direction of the electro-propelled thrusters is given by its azimuth "$Az_{ZX/Y}$" and its elevation "$El_{ZX/Y}$" in the system of coordinates of the fixed body of the satellite, as measured from +Z to +X along +Y.

The direction of the thrust vector for electro-propelled thrusters is given by the following vector, on the one hand, in the system of coordinates of the fixed body of the satellite, XYZ, and on the other, in the local orbital system of coordinates RSW:

$$\vec{e}_{thrust} = \begin{bmatrix} -\cos El \sin Az \\ -\sin El \\ -\cos El \cos Az \end{bmatrix}_{XYZ} = \begin{bmatrix} -\cos El \cos Az \\ -\cos El \sin Az \\ +\sin El \end{bmatrix}_{RSW}$$

In the following part of the description, the following notations will be able to be used to denote the thrust nozzles of the first set 101:

NE to denote the thrust nozzle N1;
NW to denote the thrust nozzle N2,
SE to denote the thrust nozzle S1, and
SW to denote the thrust nozzle S2.

Those skilled in the art will understand that the notations (NE, NW, SE, SW) for the thrust nozzles of the first set 101 are not limiting and are used only by convention in order to facilitate the description of certain embodiments of the invention.

The configuration matrix $C_{sk}$ of dimensions 3 by 4 represents the direction of the thrust vector of the four electro-propelled thrusters (EP) in the local orbital system of coordinates, RSW:

$$C_{sk} = [\vec{e}_{NE} \vdots \vec{e}_{NW} \vdots \vec{e}_{SE} \vdots \vec{e}_{SW}]_{RSW}$$

In the description hereinafter, the configuration matrix and its signature will be described in detail for three preferred embodiments of the invention.

The thrust nozzle system using electrical propulsion 100 in FIG. 2 corresponds to a symmetrical minimal configuration in a single plane.

In this configuration, the four thrusters using electrical propulsion have, taken in pairs, opposite signs of components and have an angle of inclination 8 substantially identical with respect to the North/South axis. The four thrust nozzles do not have any radial component along the Z axis:

The elevation $El_{ZX/Y}$ and the azimuth $Az_{ZX/Y}$ for each of the thrust nozzles in this first embodiment of the invention are given by the following matrix:

|  | NE | NW | SE | SW |
|---|---|---|---|---|
| $El_{ZX/Y}$ | $-(90°-\theta)$ | $-(90°-\theta)$ | $+(90°-\theta)$ | $+(90°-\theta)$ |
| $Az_{ZX/Y}$ | $90°$ | $270°$ | $90°$ | $270°$ |

Here, the thrusters are numbered in an order chosen solely by convention (NE, NW, SE and SW) and which will be used in the following part of the description. Those skilled in the art will understand that this order is completely non-limiting but is chosen so as to facilitate the description hereinafter.

The configuration matrix $C_{sk}$ corresponding to this thrust nozzle system is then:

$$C_{SK} = \begin{bmatrix} 0 & 0 & 0 & 0 \\ -\sin\theta & +\sin\theta & -\sin\theta & +\sin\theta \\ -\cos\theta & -\cos\theta & +\cos\theta & +\cos\theta \end{bmatrix}_{RSW}$$

This leads to the following signature:

$$\text{sgn } C_{SK} = \begin{bmatrix} 0 & 0 & 0 & 0 \\ - & + & - & + \\ - & - & + & + \end{bmatrix}_{RSW}$$

The configuration matrix gives the orientations of the thrust vectors of the various thrusters in the satellite reference frame. Its signature gives the signs of the components of the thrust vector for each thrust nozzle ("0" for zero component, "+" for positive component, <<–>> for negative component).

FIG. 3 shows the thrust nozzle system 100 according to a second embodiment of the invention. In this second embodiment of the invention, the set of thrust nozzles 101 has a regular tetrahedral configuration.

In this second embodiment, the first set of thrust nozzles N1, N2, S1 and S2 (respectively denoted in this figure by NE, NW, SE and SW) comprises four non-coplanar thrusters using electrical propulsion (North/South axis) which each form an angle of inclination $\theta$ with respect to the Y axis, substantially equal, and a pivot angle $\sigma$ with respect to the XY plane. The thrusters have, taken in pairs, opposite signs of components; this allows all the orbital elements to be controlled and a torque capacity to be obtained.

In particular, the angle of inclination $\theta$ with respect to the Y axis can be in the range between 40 and 45 degrees, whereas the pivot angle $\sigma$ with respect to the XY plane can be in the range between 10 and 20 degrees.

The elevation $El_{ZX/Y}$ and the azimuth $Az_{ZX/Y}$ for each of the thrust nozzles of the first set of thrust nozzles 101 are given by the following matrix according to this second embodiment of the invention:

|  | NE | NW | SE | SW |
|---|---|---|---|---|
| $El_{ZX/Y}$ | $-(90°-\theta)$ | $-(90°-\theta)$ | $+(90°-\theta)$ | $+(90°-\theta)$ |
| $Az_{ZX/Y}$ | $90°+\sigma$ | $270°-\sigma$ | $90°-\sigma$ | $270°+\sigma$ |

The corresponding configuration matrix $C_{sk}$ is then:

$$C_{SK} = \begin{bmatrix} +\sin\theta\sin\sigma & +\sin\theta\sin\sigma & -\sin\theta\sin\sigma & -\sin\theta\sin\sigma \\ -\sin\theta\cos\sigma & +\sin\theta\cos\sigma & -\sin\theta\cos\sigma & +\sin\theta\cos\sigma \\ -\cos\theta & -\cos\theta & +\cos\theta & +\cos\theta \end{bmatrix}_{RSW}$$

The corresponding signature in the RSW reference frame, for this configuration matrix, is:

$$\text{sgn } C_{SK} = \begin{bmatrix} + & + & - & - \\ - & + & - & + \\ - & - & + & + \end{bmatrix}_{RSW}$$

Those skilled in the art will readily understand that the first embodiment of the invention corresponds to an application of the second embodiment with $\sigma=0$.

Figure 4:
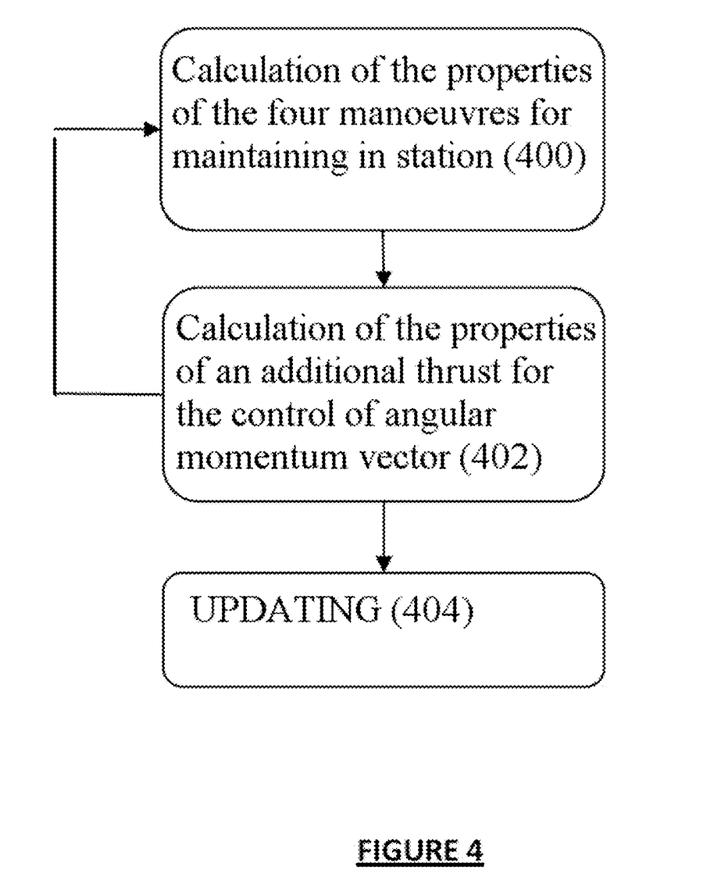
FIG. 4 is a flow diagram representing a method for control of the thrust nozzle system for maintaining in station and the control of the angular momentum vector, according to one embodiment of the invention.

FIG. 4 shows the thrust nozzle system 100 according to a third embodiment of the invention. In this third embodiment of the invention, the thrust nozzle system has an irregular tetrahedral configuration.

In this configuration, the first set of thrust nozzles 101 comprises four thrusters using electrical propulsion N1, N2, S1 and S2 (respectively denoted in this figure by NE, NW, SE and SW) in pairs symmetrical with respect to the Y axis (North/South axis) which each form angles of inclination $\theta i$ with respect to the Y axis, and respective pivot angles $\sigma i$ with respect to the XY plane. The angle $\sigma i$ represents the angle of rotation about Y going from X to Z. In FIG. 3, the angle $\sigma i$ is for example positive for the thrust nozzle N1.

According to this third embodiment, the four thrust nozzles NE, NW, SE and SW of the first set of thrust nozzles 101 have different respective angles of inclination $\theta_{NE}$, $\theta_{NW}$, $\theta_{SE}$, $\theta_{SW}$ and different respective pivot angles $\sigma_{NE}$, $\sigma_{NW}$, $\sigma_{SE}$, $\sigma_{SW}$.

The elevation $El_{ZX/Y}$ and the azimuth $Az_{ZX/Y}$ for each of the thrust nozzles of the first set of thrust nozzles 101 are given by the following matrix according to this third embodiment of the invention:

|  | NE | NW | SE | SW |
|---|---|---|---|---|
| $El_{ZX/Y}$ | $-(90°-\theta_{NE})$ | $-(90°-\theta_{NW})$ | $+(90°-\theta_{SE})$ | $+(90°-\theta_{SW})$ |
| $Az_{ZX/Y}$ | $90°+\sigma_{NE}$ | $270°-\sigma_{NW}$ | $90°-\sigma_{SE}$ | $270°+\sigma_{SW}$ |

The configuration matrix $C_{sk}$ corresponding to this third embodiment is then:

$$C_{SK} = \begin{bmatrix} +\sin\theta_{NE}\sin\sigma_{NE} & +\sin\theta_{NW}\sin\sigma_{NW} & -\sin\theta_{SE}\sin\sigma_{SE} & -\sin\theta_{SW}\sin\sigma_{SW} \\ -\sin\theta_{NE}\cos\sigma_{NE} & +\sin\theta_{NW}\cos\sigma_{NW} & -\sin\theta_{SE}\cos\sigma_{SE} & +\sin\theta_{SW}\cos\sigma_{SW} \\ -\cos\theta_{NE} & -\cos\theta_{NW} & +\cos\theta_{SE} & +\cos\theta_{SW} \end{bmatrix}_{RSW}$$

The resulting signature is as follows:

$$\operatorname{sgn} C_{SK} = \begin{bmatrix} + & + & - & - \\ - & + & - & + \\ - & - & + & + \end{bmatrix}_{RSW}$$

Those skilled in the art will readily understand that the first embodiment of the invention corresponds to a particular application of the second embodiment with $\theta_{NE}=\theta_{NW}=\theta_{SE}=\theta_{SW}=\theta$ and pivot angles $\sigma_{NE}=\sigma_{NW}=\sigma_{SE}=\sigma_{SW}=\sigma$.

The satellite in orbit is subjected to various interfering forces that can modify the characteristics of its orbit, such as atmospheric friction, caused by the Earth's residual atmosphere at the satellite altitude, which induces a deceleration on the satellite, or else the combined attractions of the sun and the moon which have the effect of decreasing the inclination of the orbital plane on the equator.

The aim of the maintenance in station is to conserve the characteristics of the orbit in order to allow the satellite to correctly fulfil its mission.

The maintenance in station typically takes place 4 or 5 days per week by means of station maintenance manoeuvres. As needed, the thrusters using electrical propulsion may also be brought into operation on a daily basis (7 days per week). Those skilled in the art will readily understand that these frequencies relating to the maintenance in station are given by way of non-limiting example.

The following vector $\vec{\Delta \alpha}$ is used to indicate the targeted corrections for the natural perturbations that act on the geostationary orbit, corrections at the end of the day, expressed in the equinoxial orbital elements (non-singular elements for the circular and equatorial orbit):

$$\vec{\Delta \alpha}^T = [\Delta a \Delta e_x \Delta e_y \Delta i_x \Delta i_y]$$

The equinoxial orbital elements comprise:
the element a representing the semi-major axis;
the elements $e_x$ and $e_y$ representing the eccentricity vectors; and
the elements $i_x$ and $i_y$ representing the inclination vectors.

The parameters $\Delta a$, $\Delta e_x$, $\Delta e_y$, $\Delta i_x$ and $\Delta i_y$ denote the targeted corrections for the equinoxial orbital elements a, $e_x$, $e_y$, $i_x$ and $i_y$ respectively, at the end of the weekly cycle for maintaining in station.

The vector $\vec{\Delta V}$ denotes the cost of the control in speed increment of the equinoxial orbital elements independently of one another:

$$\vec{\Delta V}^T = [\Delta Va \ \Delta Ve_x \ \Delta Ve_y \ \Delta Vi_x \ \Delta Vi_y] = \left[ \frac{V}{2}\frac{\Delta a}{a} \ \frac{V}{2}\Delta e_x \ \frac{V}{2}\Delta e_y \ V\Delta i_x \ V\Delta i_y \right]$$

where V represents the speed of the geostationary orbit.

In the strategy for maintaining in station according to the invention, for each of the 4 or 5 control days, each thrust nozzle amongst the thrust nozzles of the first set 101 is ignited once for the maintenance in station, at various orbital positions, applying various durations of thrust in such a manner that the net correction of the orbital elements at the end of the day is equal to the vector $\vec{\Delta \alpha}$.

The application of the strategy for maintaining in station according to the invention, without considering the potential errors, yields the following annual cost $\Delta V_{sk}$ for the station maintenance control in terms of speed increment:

$$\Delta V_{SK} \cong \frac{\sqrt{\Delta Vi_x^2 + \Delta Vi_y^2}}{\overline{\cos\theta}}$$

In this expression, "$\overline{\cos\theta}$" denotes the mean cosine loss due to the angles of inclination $\theta$ of the four thrust nozzles of the first set 101 used for the maintaining in station.

The set of thrust nozzles 101 according to the embodiments of the invention allows the 5 equinoxial orbital elements to be corrected if the following condition relative to the angles of inclination $\theta$ of the 4 thrusters N1, N2, S1 and S2 is satisfied:

$$\theta \geq \theta_{min} \quad \theta_{min} = \arctan \frac{\sqrt{\Delta Ve_x^2 + \Delta Ve_y^2}}{\sqrt{\Delta Vi_x^2 + \Delta Vi_y^2}}$$

The value of $\theta_{min}$ can be 5-10 degrees.

The maximum value of $\sqrt{\Delta Vi_x^2 + \Delta Vi_y^2}$ can be 52 m/sec per year of control. This value represents the cost of correction of the secular drift due to the lunar-solar effect.

As is known, irrespective of their trajectory or their orbit, satellites must conserve a precisely defined attitude, in order to ensure, depending on their mission, the correct orientation of their antennas, of their solar panels, of the scientific instruments installed on board. The attitude thus denotes the angular orientation of the satellite. The attitude of the satellite is generally controlled by internal actuators such as flywheels allowing an internal torque to be applied to the space vehicle and a rotation about one of its axes X, Y, Z to be generated, the axes X, Y, Z referring to the reference frame linked to the space vehicle. However, the space vehicle tends to become misaligned under the action of interfering torques produced by the environment such as solar pressure, aerodynamic frictional forces, electromagnetic torques, torques due to the gravitational gradient. The angular orientation of the space vehicle must therefore be actively controlled and the stability of this orientation along its three axes ensured. The attitude control is provided in a continuous manner by a closed-loop control comprising sensors which measure the orientation of the space vehicle, an onboard computer which processes these measurements and establishes the commands which are executed by one or more actuators in order to counterbalance the drifts and to maintain an orientation in a chosen direction. However, each time that the flywheels supply an internal torque, their speed increases until it reaches a maximum speed called saturation speed. When the maximum speed is reached, the flywheels cannot perform the compensation for the drifts and the onboard computer then performs an operation for unsaturation of the flywheels (referred to as "wheels unloading"). At high altitude or in geostationary orbit GEO (acronym for the expression "Geosynchronous Earth Orbit"), the ignition of the thrusters using electrical propulsion of the set 101, provided in the framework of the maintenance in station according to the invention, may also be used for controlling the angular momentum vector, and thus implementing the unloading of the flywheels. It also allows an orbital manoeuvre plane to be conceived which guarantees that the satellite remains within the range of the flywheels.

In this embodiment according to the invention, the thrust nozzles of the set 101 are thus used in combination for the maintenance in station and the control of the angular momentum vector.

FIG. 4 is a flow diagram representing the various steps implemented for the maintenance in station and the control of the angular momentum vector according to one embodiment of the invention.

At the step 400, the properties of the four daily manoeuvres for maintaining in station are calculated without taking into account the control of the angular momentum vector. This calculation may be implemented according to the equations A1 and A2 in Appendix A, in the example of the configuration of thrust nozzles in FIG. 3. The configuration in FIG. 3 is a symmetrical configuration of thrust nozzles arranged in a single plane (same angle of inclination for the 4 thrusters and without any radial component along the Z axis).

More precisely, in order to calculate the properties of the 4 impulse thrust manoeuvres, the system of equations in Appendix A1 may be solved (known by the name of Gauss equations for the equinoxial orbital elements).

The system of equations may be written in the form of the matrix A2 in Appendix A of dimensions 4 over 5 where V denotes the speed of the geostationary orbit.

Such a system of equations can be solved numerically by using a non-linear optimization solver. The decision variables represent the amplitude of the 4 pulsed thrust manoeuvres ($\Delta V_{NE}, \Delta V_{NW}, \Delta V_{SE}, \Delta V_{SW}$) and the position of the four pulsed thrust manoeuvres ($L_{NE}, L_{NW}, L_{SE}, L_{SW}$) expressed in the right ascension of the satellite, i.e. the $6^{th}$ equinoxial orbital element.

Those skilled in the art will note that, in the equations A1 and the matrix A2 in Appendix A, impulse thrust manoeuvres are considered. However, as a variant, distributed thrust manoeuvres may be considered for this calculation, by using the equation A4 in Appendix A which gives the finite duration $\Delta t_{burn}$ of the thrust interval, or "burn time", of the four thrusts as a function of impulse speed $\Delta V_{burn}$, of the burn time, of the mass m of the satellite and of the thrust F of the vehicle using electrical propulsion. The method provides the calculation of the duration of each manoeuvre based on the knowledge of the Delta-V and of the mass of the satellite, in the embodiment where impulse thrust manoeuvres are considered. The impulse thrust manoeuvres denote thrusts of very short duration delivering an impulse of speed $\Delta V$ supplied over a very short time. The corresponding thrust is applied during a negligible period of time compared with the period of the orbit.

At the step 402, the properties of an additional thrust for the control of the angular momentum vector are calculated, without overlap with the four burn times previously planned.

The step 402 thus introduces an additional thrust for the control of the angular momentum vector.

The steps 400 and 402 are subsequently iterated in order to take into account the effect of the introduction of an additional thrust (step 402) and of the change in the characteristics of the manoeuvres on the correction of the orbital elements.

At the step 404, the properties of the 4 manoeuvres for maintaining in station and of the additional thrust are updated (for example, by modifying the initial and the final thrust time) in order to satisfy the two objectives. Those skilled in the art will readily understand that the additional manoeuvre is not necessary for every manoeuvre day.

Such a method converge towards a "feasible" solution for the combined control (maintenance in station and momentum vector). When it is compared with the solution for maintenance in station alone, the solution for combined control (maintenance in station and control of the angular momentum vector) is characterized by an additional thrust and by an additional Delta-V cost.

It is also possible, according to the invention, to directly solve, in a single step, the combined problem of the two objectives (as presented in Appendix A). The total number of decision variables is then:

5(orbital elements)+3(components of the angular momentum vector)=8.

The total number of unknowns is thus 8 (positions and delta-V for each daily manoeuvre). The combined problem may then be qualified as squared, in other words not under-determined and not over-determined. Several solutions can then be found for the problem of maintaining in station.

Such a problem can then be solved notably by using a non-linear least-squares routine.

If an additional thrust is added, the number total of unknowns becomes 10 (5*2). The problem then becomes under-determined. Amongst the possible solutions, those that have a minimal Delta-V cost are preferred. Such a problem can then be solved by using a numerical optimization routine, the objective function to be minimized being the mass of propellant consumed or, in an equivalent manner, the sum of the Delta-V moduli. The function with objective for minimizing the sum of the amplitudes of the 4 thrusts is given by the equation A3 in Appendix A:

$$\Delta V_{SK} = \Delta V_{NE} + \Delta V_{NW} + \Delta V_{SE} + \Delta V_{SW} \quad (A3)$$

The finite duration of the burn time for the four thrusts is calculated by using the following approximation (A4), where m denotes the mass of the satellite and F the thrust of the vehicle using electrical propulsion:

$$\Delta t_{burn} \cong \frac{m \Delta V_{burn}}{F} \quad (A4)$$

The invention thus provides a thrust nozzle system using electrical propulsion whose pre-adjustment allows all the functions in the life of a satellite to be performed efficiently, without it being necessary to provide any additional mechanism in the satellite. This results in a significant mass gain and reduced costs.

It goes without saying that the present invention is not limited to the examples and embodiments described and shown, and is capable of many variants accessible to those skilled in the art. In particular, the invention has been described with reference to a system of 6 thrusters but may include a higher number of thrust nozzles according to the requirements inherent to the satellite.

Various criteria may be applied for the choice of the number of thrust nozzles in each set 101 or 102. For example, if a reduced transfer time is desired, it is possible to increase the number of thrust nozzles in the set 102 (for example 4). Furthermore, in order to define the strategy for replacing a thruster of the set for maintaining in station 101 in the case of an anomaly, a number of thrust nozzles greater than 4 may be chosen for the set of thrust nozzles 101.

Although the description hereinbefore has been presented in relation to a set of thrust nozzles 100 comprising the first set 101 and the second set 102, in some embodiments of the invention, the thrust nozzle system may only comprise the thrusters N1, N2, S1 and S2 of the first set, for example in the case of a direct injection by a commercial launch vehicle into the geostationary orbit which does not require setting into station.

In the embodiments where the set of thrust nozzles 100 comprises both the first set 101 and the second set 102, those skilled in the art will note that the direction of resultant thrust of the set 102 may be situated on other satellite axes depending on the installation constraints existing on the satellite.

Furthermore, in the description hereinbefore, examples of values have been given for the angles of inclination θ and σ. However, the invention is applicable to other values.

APPENDIX A

Solution of the Problem of the Maintenance in Station for the Exemplary Configuration in FIG. 3

$$\begin{bmatrix} \frac{\Delta a}{a} \\ \Delta e_x \\ \Delta e_y \\ \Delta i_x \\ \Delta i_y \end{bmatrix} = \begin{bmatrix} \frac{2}{V} & 0 \\ \frac{2\cos L_{NE}}{V} & 0 \\ \frac{2\sin L_{NE}}{V} & 0 \\ 0 & \frac{\cos L_{NE}}{V} \\ 0 & \frac{\sin L_{NE}}{V} \end{bmatrix} \times \begin{bmatrix} -\sin\theta \\ -\cos\theta \end{bmatrix} \Delta V_{NE} + \begin{bmatrix} \frac{2}{V} & 0 \\ \frac{2\cos L_{NW}}{V} & 0 \\ \frac{2\sin L_{NW}}{V} & 0 \\ 0 & \frac{\cos L_{NW}}{V} \\ 0 & \frac{\sin L_{NW}}{V} \end{bmatrix} \times \begin{bmatrix} +\sin\theta \\ -\cos\theta \end{bmatrix} \Delta V_{NW} + \quad (A1)$$

$$\ldots + \begin{bmatrix} \frac{2}{V} & 0 \\ \frac{2\cos L_{SE}}{V} & 0 \\ \frac{2\sin L_{SE}}{V} & 0 \\ 0 & \frac{\cos L_{SE}}{V} \\ 0 & \frac{\sin L_{SE}}{V} \end{bmatrix} \times \begin{bmatrix} -\sin\theta \\ +\cos\theta \end{bmatrix} \Delta V_{SE} + \begin{bmatrix} \frac{2}{V} & 0 \\ \frac{2\cos L_{SW}}{V} & 0 \\ \frac{2\sin L_{SW}}{V} & 0 \\ 0 & \frac{\cos L_{SW}}{V} \\ 0 & \frac{\sin L_{SW}}{V} \end{bmatrix} \times \begin{bmatrix} +\sin\theta \\ +\cos\theta \end{bmatrix} \Delta V_{SW}$$

$$\begin{bmatrix} \frac{\Delta a}{a} \\ \Delta e_x \\ \Delta e_y \\ \Delta i_x \\ \Delta i_y \end{bmatrix} = \begin{bmatrix} \frac{-2\sin\theta}{V} & \frac{+2\sin\theta}{V} & \frac{-2\sin\theta}{V} & \frac{+2\sin\theta}{V} \\ \frac{-2\sin\theta}{V}\cos L_{NE} & \frac{+2\sin\theta}{V}\cos L_{NW} & \frac{-2\sin\theta}{V}\cos L_{SE} & \frac{+2\sin\theta}{V}\cos L_{SW} \\ \frac{-2\sin\theta}{V}\sin L_{NE} & \frac{+2\sin\theta}{V}\sin L_{NW} & \frac{-2\sin\theta}{V}\sin L_{SE} & \frac{+2\sin\theta}{V}\sin L_{SW} \\ \frac{-\cos\theta}{V}\cos L_{NE} & \frac{-\cos\theta}{V}\cos L_{NW} & \frac{+\cos\theta}{V}\cos L_{SE} & \frac{+\cos\theta}{V}\cos L_{SW} \\ \frac{-\cos\theta}{V}\sin L_{NE} & \frac{-\cos\theta}{V}\sin L_{NW} & \frac{+\cos\theta}{V}\sin L_{SE} & \frac{+\cos\theta}{V}\sin L_{SW} \end{bmatrix} \times \begin{bmatrix} \Delta V_{NE} \\ \Delta V_{NW} \\ \Delta V_{SE} \\ \Delta V_{SW} \end{bmatrix} \quad (A2)$$

(A3)
Function with objective for minimizing the sum of the amplitudes of the 4 thrusts:

$$\Delta V_{SK} = \Delta V_{NE} + \Delta V_{NW} + \Delta V_{SE} + \Delta V_{SW}$$

(A4) Finite duration of the burn time for the four thrusts:

$$\Delta t_{burn} \cong \frac{m \Delta V_{burn}}{F}$$

The invention claimed is:

1. A thrust nozzle system for a satellite designed to be stabilized in autorotation over a geostationary orbit, said satellite comprising three reference axes X, Y and Z, the Y axis representing a North/South axis and the Z axis corresponding to an Earth pointing direction, comprising a first set of thrust nozzles configured for maintaining the satellite in station, the first set comprising an even number of thrust nozzles using electrical propulsion, with a pre-adjusted orientation, said even number being equal to at least 4, said first set of thrust nozzles comprising a pair of thrust nozzles on either side of the plane XZ, said thrust nozzles being oriented along three spatial components, the two thrust nozzles of each pair having different signs of X components and same signs of Y components, two thrust nozzles of two different pairs having opposite Y signs.

2. The thrust nozzle system according to claim 1, wherein the satellite has a centre of gravity and the position of the fixed thrust nozzles is chosen such that the thrust nozzles pass through a neighbourhood of the centre of gravity of the satellite while conserving a limited torque with respect to the capacity of the flywheels of the satellite.

3. The thrust nozzle system according to claim 2, wherein the position of the thrust nozzles is furthermore chosen in such a manner as to take into account the displacement of the centre of gravity of the satellite over the lifetime of the satellite.

4. The thrust nozzle system according to claim 1, characterized in that it comprises a second set of thrust nozzles comprising at least two thrusters using electrical propulsion, said second set of thrust nozzles being configured for implementing at least the setting into station of the satellite, the thrust nozzles of the second set being oriented substantially along a same satellite axis.

5. The thrust nozzle system according to claim 1, wherein each thrust nozzle of the first set forms a chosen angle of inclination θ with respect to the Y axis.

6. The thrust nozzle system according to claim 5, wherein the thrust nozzles of the first set have angles of inclination θ that are substantially identical with respect to the Y axis.

7. The thrust nozzle system according to claim 1, wherein the thrust nozzles of the first set have different angles of inclination θ with respect to the Y axis.

8. The thrust nozzle system according to claim 1, wherein the satellite is defined by a body comprising a North face, a South Face, a West Face and an East Face according to the direction of said three axis X, Y and Z, said first set of thrust nozzles comprising a thrust nozzle arranged on the edge bounded by the North face and East face of the body of the satellite.

9. The thrust nozzle system according to claim 1, wherein the satellite is defined by a body comprising a North face, a South Face, a West Face and an East Face according to the direction of said three axis X, Y and Z, said first set of thrust nozzles comprising a thrust nozzle arranged on the edge bounded by the South face and East face of the body of the satellite.

10. The thrust nozzle system according to claim 1, wherein the satellite is defined by a body comprising a North face, a South Face, a West Face and an East Face according to the direction of said three axis X, Y and Z, said first set of thrust nozzles comprising a thrust nozzle arranged on the North face in the neighbourhood of the edge bounded by the North face and West face.

11. The thrust nozzle system according to claim 1, wherein the satellite is defined by a body comprising a North face, a South Face, a West Face and an East Face according to the direction of said three axis X, Y and Z, said first set of thrust nozzles comprising a thrust nozzle arranged on the South face in the neighbourhood of the edge bounded by the South face and East face of the body of the satellite.

12. The thrust nozzle system according to claim 1, wherein the satellite is defined by a body comprising a North face, a South Face, a West Face and an East Face according to the direction of said three axis X, Y and Z, said first set of thrust nozzles comprising a thrust nozzle arranged on the East face of the body of the satellite in the neighbourhood of the edge bounded by the South face and East face of the body of the satellite.

13. The thrust nozzle system according to claim 1, wherein the satellite is defined by a body comprising a North face, a South Face, a West Face and an East Face according to the direction of said three axis X, Y and Z, said first set of thrust nozzles comprising a thrust nozzle arranged on the West face of the body of the satellite in the neighbourhood of the edge bounded by the South face and West face of the body of the satellite.

14. The thrust nozzle system according to claim 1, wherein the thrust nozzles of the first set are non-coplanar.

15. The thrust nozzle system according to claim 1, wherein at least one of the thrust nozzles of the first set forms a pivot angle σ a with respect to the YZ plane.

16. The thrust nozzle system according to claim 1, wherein the thrust nozzles of the first set have respective different pivot angles σ a with respect to the YZ plane.

17. The thrust nozzle system according to claim 15, wherein the satellite is defined by a body, said first set of thrust nozzles comprising at least one thrust nozzle arranged in the neighbourhood of an external corner of the body of the satellite.

18. The thrust nozzle system according to claim 1, wherein the satellite comprises flywheels, and in that the first set of thrust nozzles is used to perform a control of an angular momentum vector, in the case of unsaturation of the momentum wheels.

19. A method for the orbit and attitude control of a geostationary satellite, comprising a thrust nozzle system for a satellite designed to be stabilized in autorotation over a geostationary orbit, said satellite comprising three reference axes X, Y and Z, the Y axis representing the North/South axis and the Z axis corresponding to an Earth pointing direction, the thrust nozzle system comprising a first set of thrust nozzles configured for maintaining the satellite in station, the first set comprising an even number of thrust nozzles using electrical propulsion, with a pre-adjusted orientation, said even number being equal to at least 4, said first set of thrust nozzles comprising a pair of thrust nozzles on either side of the plane XZ, said thrust nozzles being oriented along three spatial components, the two thrust nozzles of each pair having different signs of X components and same signs of Y components, two thrust nozzles of two different pairs having opposite Y signs, wherein the method further comprising ignition of the thrust nozzles of the first set independently of one another while the satellite is maintained in station.

20. The method according to claim 19, wherein maintaining the satellite in station is carried out over a given number of control days, and in that the method comprises, for each control day, the placing of one thrust nozzle from the first set of thrust nozzles at a given orbital position, by applying a chosen duration of thrust in such a manner that the net correction of the orbital elements at the end of the day is equal to a target correction vector.

21. The method according to claim 19, further comprising activation of the thrust nozzles of the second set of thrust nozzles in one at least of the following phases from amongst the phases of life of the satellite: repositioning of the satellite, the setting into stable orbit at the end of life of the satellite.

22. The method according to claim 21, further comprising simultaneous ignition of the thrust nozzles of the second set of thrust nozzles.

* * * * *